US012553562B2

(12) United States Patent
Kendrioski

(10) Patent No.: US 12,553,562 B2
(45) Date of Patent: Feb. 17, 2026

(54) INSERT WITH DIAMETRAL LOCKING FEATURE AND INDICATION FEATURE FOR INSTALLATION AND METHOD OF INSTALLATION THEREOF

(71) Applicant: The Lee Company, Westbrook, CT (US)

(72) Inventor: Walter Kendrioski, Guilford, CT (US)

(73) Assignee: THE LEE COMPANY, Westbrook, CT (US)

( * ) Notice: Subject to any disclaimer, the term of this patent is extended or adjusted under 35 U.S.C. 154(b) by 530 days.

(21) Appl. No.: 18/181,692

(22) Filed: Mar. 10, 2023

(65) Prior Publication Data

US 2023/0288011 A1    Sep. 14, 2023

Related U.S. Application Data

(60) Provisional application No. 63/318,652, filed on Mar. 10, 2022.

(51) Int. Cl.
*F16L 55/13* (2006.01)
*F16L 55/11* (2006.01)

(52) U.S. Cl.
CPC .............. *F16L 55/13* (2013.01); *F16L 55/11* (2013.01); *Y10T 29/49938* (2015.01)

(58) Field of Classification Search
CPC .... B65D 39/0029; B65D 39/04; B65D 39/12; B65D 59/02; B65D 2539/003; F02B 77/005; F16B 13/063; F16B 13/128; F16B 19/10; F16B 2019/1018; F16L 55/11; F16L 55/141; F16L 55/13; F16L 55/132; F16L 55/136; F22B 37/223; F28F 11/02; F28F 11/06; Y10T 29/49938
USPC ...... 4/295; 215/358, 362; 220/233, 234, 237
See application file for complete search history.

(56) References Cited

U.S. PATENT DOCUMENTS

| | | | | |
|---|---|---|---|---|
| 2,514,827 A | * | 7/1950 | Alvear | B65D 39/04 217/110 |
| 2,821,323 A | * | 1/1958 | Lee, II | F16L 55/13 29/523 |
| 3,262,353 A | * | 7/1966 | Waeltz | F16B 19/1063 411/39 |
| 3,325,891 A | * | 6/1967 | Chovan | B22D 17/24 29/458 |
| 3,451,583 A | * | 6/1969 | Lee | F16L 55/132 220/233 |

(Continued)

*Primary Examiner* — Robert K Arundale
*Assistant Examiner* — Richard K. Durden
(74) *Attorney, Agent, or Firm* — CANTOR COLBURN LLP

(57) ABSTRACT

A method of installing an insert into a circumferential bore includes: axially inserting a body of the insert, a second end first, into the bore until the second end of the body engages a pre-formed support shoulder in the bore; axially pressing the body of the insert against the support shoulder of the bore while outwardly radially expanding and plastically deforming at least a second section of a diametral side wall of the insert against an interior wall of the bore; further outwardly radially pressing and plastically deforming at least an installation indication feature of the body of the insert against the interior wall of the bore until the installation indication feature contacts the interior wall of the bore around the circumference of the bore.

21 Claims, 16 Drawing Sheets

(56) References Cited

U.S. PATENT DOCUMENTS

| | | | | |
|---|---|---|---|---|
| 3,560,030 | A * | 2/1971 | Macks | F16B 17/006 |
| | | | | 29/523 |
| 3,825,146 | A * | 7/1974 | Hirmann | F16L 55/13 |
| | | | | 29/522.1 |
| 4,867,333 | A * | 9/1989 | Kolp, Jr. | F28F 11/02 |
| | | | | 29/522.1 |
| 4,930,459 | A * | 6/1990 | Coffenberry | F02B 77/005 |
| | | | | 123/41.5 |
| 5,022,437 | A * | 6/1991 | Potz | B21D 39/06 |
| | | | | 376/451 |
| 5,078,294 | A * | 1/1992 | Staubli | F16B 13/065 |
| | | | | 220/233 |
| 5,160,226 | A * | 11/1992 | Lee, II | F16L 55/13 |
| | | | | 411/72 |
| 5,848,616 | A * | 12/1998 | Vogel | B23P 11/00 |
| | | | | 29/522.1 |
| 6,460,572 | B1 * | 10/2002 | Jurgens | F16L 55/13 |
| | | | | 29/522.1 |
| 7,588,052 | B2 | 9/2009 | Reuter | |
| 10,047,866 | B2 | 8/2018 | Doyen | |
| 10,352,458 | B2 | 7/2019 | Doyen | |
| 2015/0000431 | A1 * | 1/2015 | Krauer | G01D 11/245 |
| | | | | 73/866.5 |
| 2023/0194033 | A1 * | 6/2023 | Trinchieri | F16L 55/13 |
| | | | | 138/89 |

\* cited by examiner

DETAIL B

INSERT WITH DIAMETRAL LOCKING FEATURE AND INDICATION FEATURE FOR INSTALLATION AND METHOD OF INSTALLATION THEREOF

CROSS REFERENCE TO RELATED APPLICATIONS

This application claims the benefit of U.S. Provisional Application Ser. No. 63/318,652, filed Mar. 10, 2022, which is incorporated herein by reference in its entirety.

BACKGROUND

The present disclosure relates generally to an insert with a diametral locking feature, particularly to an insert with a diametral locking feature and an indication feature for installation, and more particularly to a method of installation of an insert with a diametral locking feature and an indication feature for installation into a circumferential bore of a housing.

Insert type components such as diametral locking plugs are known in the art of hydraulic components and can be found in The Lee Company Handbook available from The Lee Company, Westbrook, Connecticut.

The following publications may be considered as useful background art: U.S. Pat. Nos. 7,588,052, 10,047,866, and 10,352,458. While existing insert type components are suitable for their intended purpose, the art relating to diametral locking inserts would be advanced with a feature and a method of installation that provides improved indication of proper installation that is visible by any suitable visual inspection apparatus.

BRIEF SUMMARY

An embodiment includes an insert with a diametral locking feature and an indication feature for installation (also herein referred to as an installation indication feature), and a method of installation thereof, as defined by the appended independent claims. Further advantageous modifications of the insert are defined by the appended dependent claims.

An embodiment includes an insert having a diametral locking feature and an installation indication feature, comprising: a body having first end, a second end, and a diametral side wall between the first end and the second end, the second end having an overall maximum outside diameter Domax; wherein the diametral side wall has an outside profile between the first end and the second end having a first section proximate the first end, a second section contiguous with the first section, a third section contiguous with the second section, and a fourth section proximate the second end and contiguous with the third section; wherein the first section has a first outside diameter Do1 that is less than Domax, and provides for the installation indication feature; wherein the second section has a second outside diameter Do2 that is equal to or less than Domax; wherein the third section has a third outside diameter equal to Do3; wherein the fourth section has a fourth outside diameter equal to Domax; wherein the diametral side wall has an inside profile between the first end and the second end having a first region proximate the first end, a second region contiguous with the first region, and a third region proximate the second end and contiguous with the second region; wherein the first region has an inside diameter that tapers from a first inside diameter Di1 to a second inside diameter Di2, where Di2 is less than Di1; wherein the second region has an inside diameter that is equal to Di2; wherein the third region has an inside diameter that tapers from Di2 to a third inside diameter Di3, where Di3 is less than Di2; wherein the tapered profile of the first region tapers from Di1 at the first end, to Di2 at an end point on the diametral side wall radially across from the second or third sections of the outside profile of the diametral side wall.

An embodiment includes a method of installing the aforementioned insert into a circumferential bore, the method comprising: axially inserting the body of the insert, second end first, into the bore until the second end of the body engages a pre-formed support shoulder in the bore; axially pressing the body of the insert against the support shoulder of the bore while outwardly radially expanding and plastically deforming at least the second section of the diametral side wall against an interior wall of the bore; further outwardly radially pressing and plastically deforming at least the installation indication feature of the body of the insert against the interior wall of the bore until the installation indication feature contacts the interior wall of the bore around the circumference of the bore.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike, and like features are illustrated alike, in the accompanying Figures.

Figure 1A:
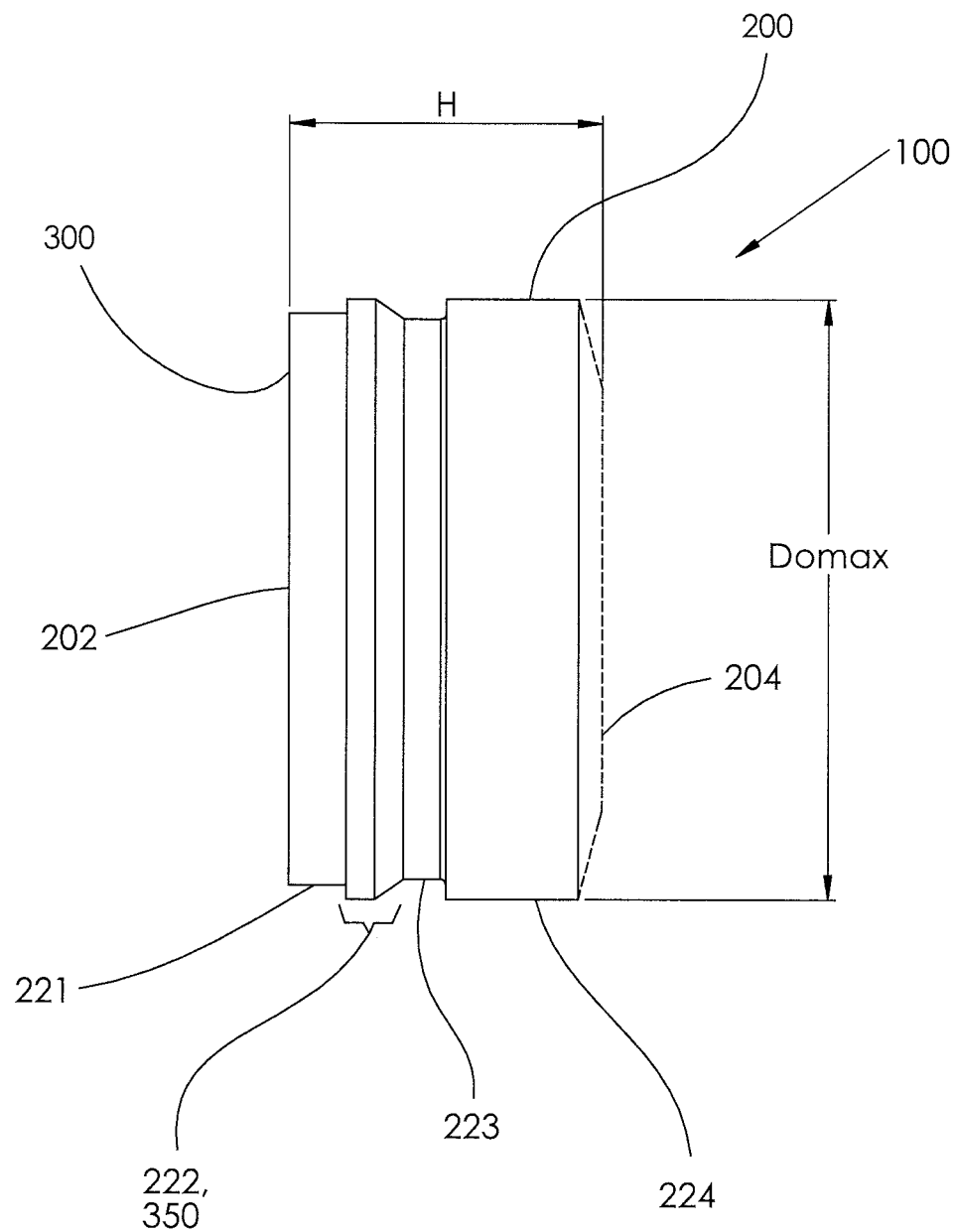
FIG. 1A depicts a side view of an example insert having a diametral locking feature and an installation indication feature, in accordance with an embodiment.

One skilled in the art will understand that the drawings, further described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures where it will be appreciated and understood that such enumeration where absent is inherently disclosed.

DETAILED DESCRIPTION

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

For a better understanding of a method of installation of an insert having a diametral locking feature and an installation indication feature, key features of the insert will first be described. First, however, it will be appreciated that the features described herein below for an insert may be utilized on a number of different hydraulic components, such as a plug, an orifice, or a check valve, for example. As such, the scope of the appended claims is only limited by the language of the appended claims, and not by any example embodiments disclosed or illustrated herein.

With reference to FIGS. 1A, 1B, 1C, 1D, 1E, and 1F, collectively, an example insert 100 having a locking feature 350 and an installation indication feature 300, comprises: a body 200 having a first end 202, a second end 204, and a diametral side wall 206 between the first end 202 and the second end 204, the second end 204 having an overall maximum outside diameter Domax. In the example embodiment depicted in FIGS. 1A-1D, the second end 204 may be interpreted as being a closed end of a plug, but in accordance with an embodiment disclosed herein may also be an open end, or an orificed end, to accommodate other hydraulic components consistent with the description herein and the appended claims. To further emphasize that the second end 204 is not necessarily a closed end of a plug, this feature is depicted in dashed-line fashion in FIGS. 1A, 1B, 1C, and 2. Also, FIGS. 3A and 3B depict, by way of non-limiting examples, alternative constructs for the second end 204 of the body 200 of the insert 100, where FIG. 3A depicts the second end 204 being closed or solid 204.1 to provide a solid-type plug, and FIG. 3B depicts the second end 204 having a through orifice 204.2 to provide an orifice-type insert product. Accordingly, it will be appreciated that the dashed-line depicted in FIGS. 1A-1C, and 2, represents any structure for the second end 204 consistent with the disclosure herein.

In an embodiment, the body 200 has an overall exterior length H. The interior of the body 200 has an interior depth h within a cavity 150 having circular axial cross sections relative to a z-axis, where h is equal to or less than H. Length H and depth h may be any dimensions suitable for a purpose disclosed herein, while being consistent with the written description provided herein.

The diametral side wall 206 has an outside profile 220 between the first end 202 and the second end 204 having a first section 221 proximate the first end 202, a second section 222 contiguous with the first section 221, a third section 223 contiguous with the second section 222, and a fourth section 224 proximate the second end 204 and contiguous with the third section 223. The first section 221 has a first outside diameter Do1 that is less than Domax, and provides for the installation indication feature 300. The second section 222 has a second outside diameter Do2 that is equal to or less than Domax. The third section 223 has a third outside diameter equal to Do3, where Do3 is less than Domax. The fourth section 224 has a fourth outside diameter equal to Domax. The transition from one outside feature to another outside feature of the outside profile 220 may be a sharp transition, a sharp radius, or any other radius suitable for a purpose disclosed herein. In an embodiment, and with reference to FIG. 1E, the outer circumferential edge 102 at Do1 is a sharp edge with a maximum radius of 0.13 mm, and the outer circumferential edge 104 at Do2 (where the transition or step change occurs from Do1 to Do2) is a sharp edge with a maximum radius of 0.13 mm. While not being held to any particular theory, it has been found that the aforementioned sharp outer edges 102 and 104 having the dimensions noted provide improved retention and installation indication performance versus a construct of the insert 100 that does not have the stated radii. While reference is made to FIG. 1E for a description of the sharp outer edges 102, 104, it will be appreciated that the same description may apply to any other embodiments of the insert 100 disclosed and illustrated herein.

In an embodiment, such as for example the embodiment depicted in FIGS. 1A-1E (see FIGS. 1D and 1E in particular), the second section 222 comprises a first portion 222.1 and a second portion 222.2, where the first portion 222.1 is contiguous with the first section 221 and has an outside diameter equal to Do2, and where the second portion 222.2 is contiguous with the first portion 222.1 and has an outside diameter that tapers from Do2 to Do3. In an embodiment, the transition from the first section 221 to the first portion 222.1 of the second section 222 is substantially a step change from diameter Do1 to diameter Do2. As used in the foregoing context, and further herein below, the term substantially encompasses small manufacturing details such as inside and outside radii on the diametral side wall 206.

Figure 1B:
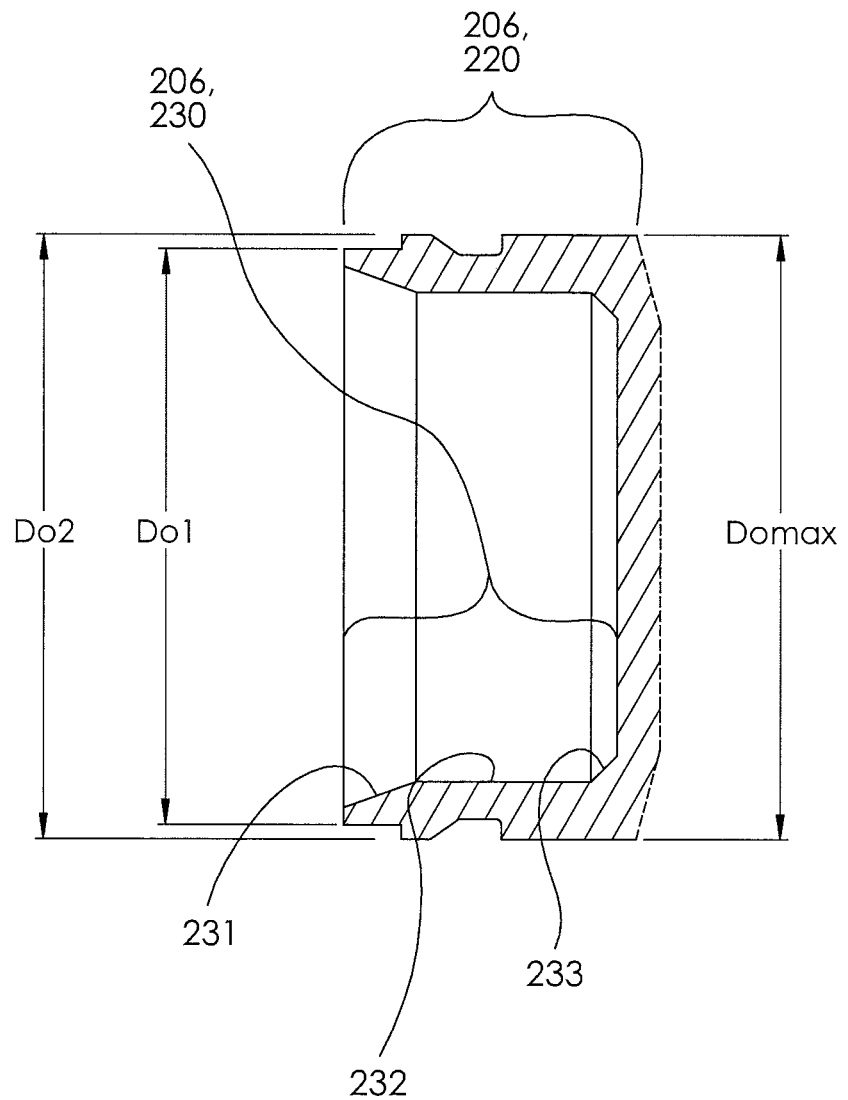
FIG. 1B depicts an axial cross section view of the example insert of FIG. 1A, in accordance with an embodiment.
Figure 1C:
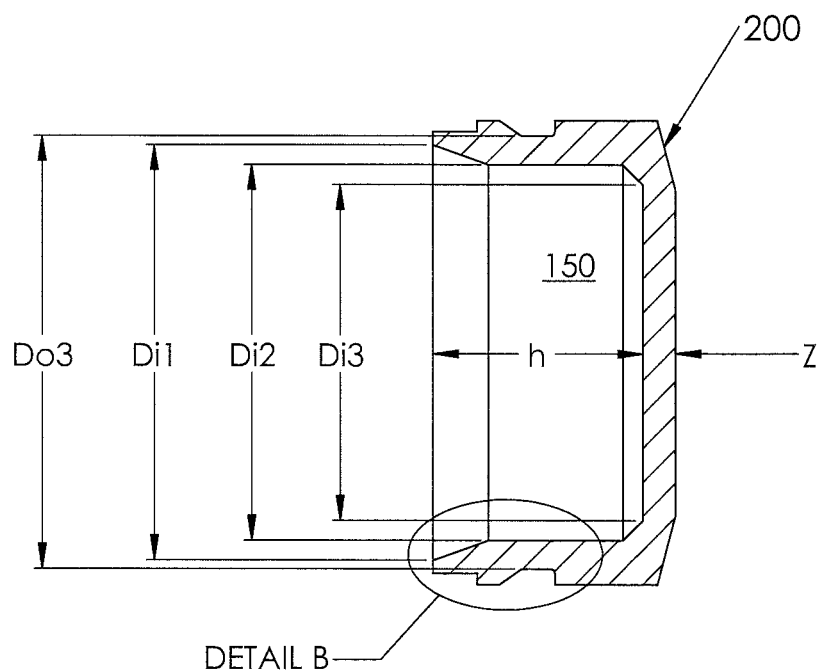
FIG. 1C depicts a repeat version of the view of FIG. 1B for clarity, in accordance with an embodiment.
Figure 1D:
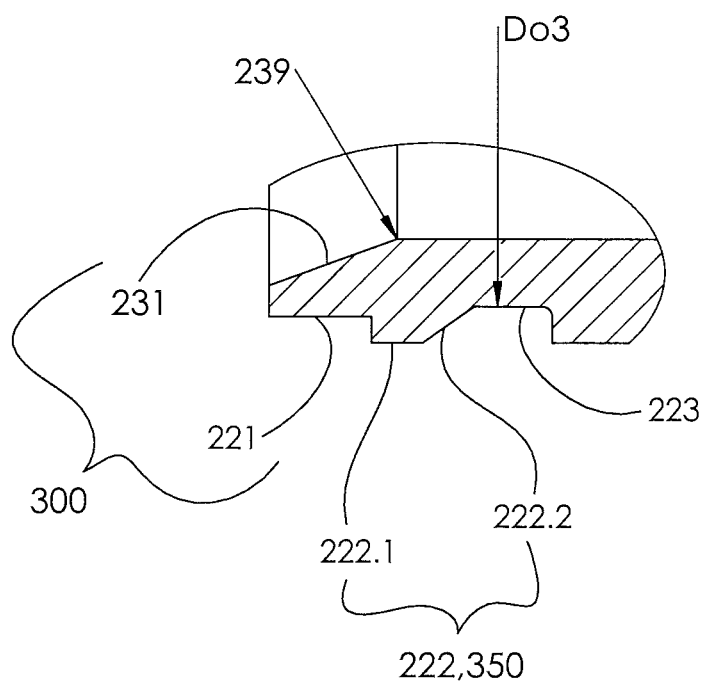
FIG. 1D depicts an enlarged portion of the axial cross section view of Detail B of FIG. 1B for clarity, in accordance with an embodiment.
Figure 1E:
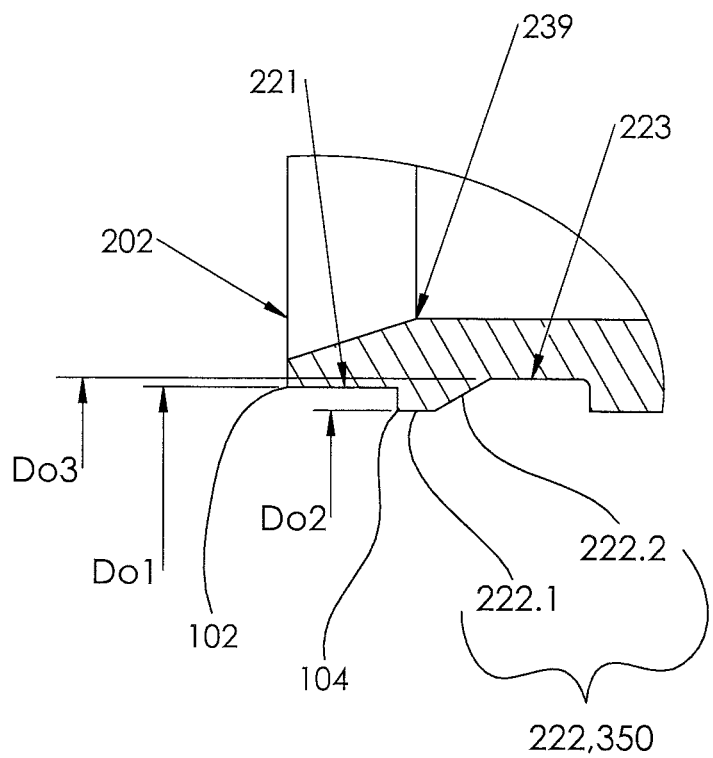
FIG. 1E depicts an alternative view to that of FIG. 1D to emphasize alternative structure for the outside profile of the insert, in accordance with an embodiment.
Figure 1F:
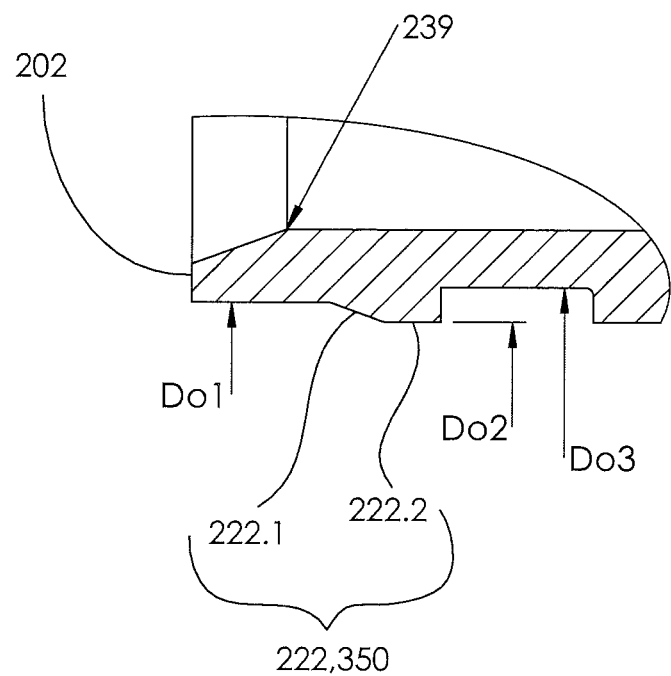
FIG. 1F depicts another alternative view to that of FIG. 1D to emphasize alternative structure for the locking feature, in accordance with an embodiment.

In another embodiment, such as for example the embodiment depicted in FIG. 1F, the second section 222 comprises a first portion 222.1 and a second portion 222.2, where the first portion 222.1 is contiguous with the first section 221 and has an outside diameter that tapers from Do1 to Do2, and where the second portion 222.2 is contiguous with the first portion 222.1 and has an outside diameter equal to Do2. In an embodiment, the transition from the second portion 222.2 of the second section 222 to the third section 223 is substantially a step change from diameter Do2 to diameter Do3.

Figure 1G:
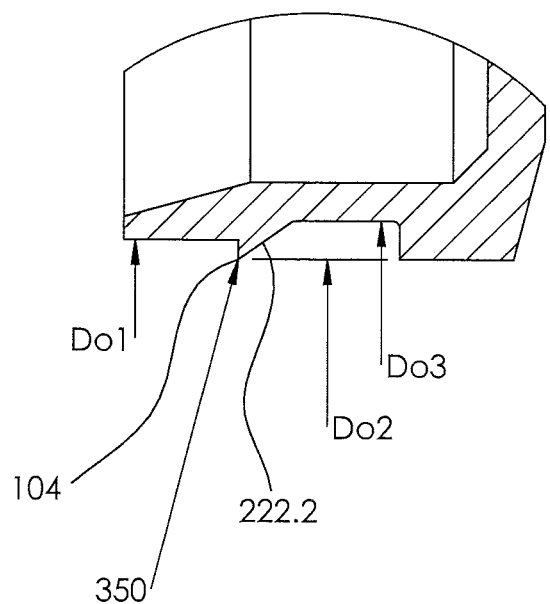
FIG. 1G depicts another alternative view to that of FIG. 1D to further emphasize alternative structure for the outside profile of the insert, in accordance with an embodiment.

In another embodiment, such as for example the embodiment depicted in FIG. 1G, the locking feature 350 may be in the form of two sides of a right-angle triangular barb that includes the second section 222 formed with only a second portion 222.2 oriented similar to that of FIGS. 1D and 1E, and absent the first portion 222.1 depicted in FIGS. 1D and 1E. Here, the second section 222 is formed by a step-wise transition from the first outside diameter Do1 to the second outside diameter Do2, and then by a ramp-wise transition from the second outside diameter Do2 to the third outside diameter Do3. In an embodiment, the apex of the right-angle triangular barb at the outer circumferential edge 104 is a sharp edge, which in an embodiment has a maximum radius of 0.13 mm.

Figure 1H:
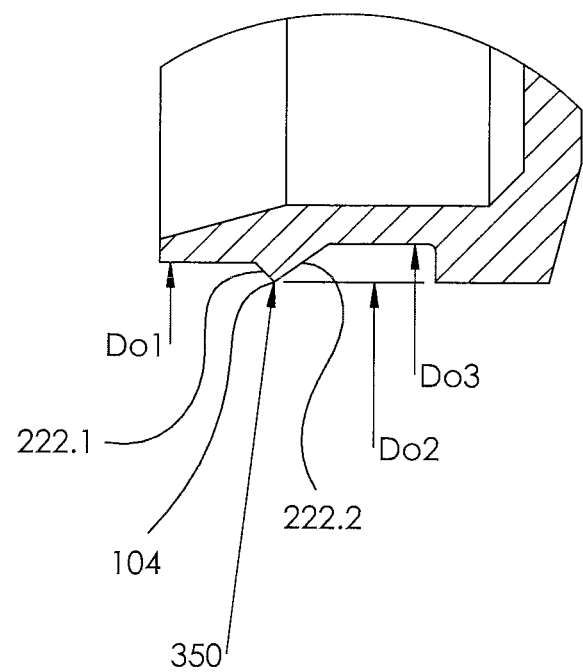
FIG. 1H depicts yet another alternative view to that of FIG. 1D to even further emphasize alternative structure for the outside profile of the insert, in accordance with an embodiment.

Alternatively, and in yet another embodiment, such as for example the embodiment depicted in FIG. 1H, the locking feature 350 may be in the form of two sides of an isosceles or equilateral triangular barb that includes the second section 222 formed with both a first portion 222.1 and a second portion 222.2, and where both of the first and second portions 222.1, 222.2 are ramped surfaces. Here, the second section 222 is formed by a first ramp-wise transition from the first outside diameter Do1 to the second outside diameter Do2, and then by a second ramp-wise transition from the second outside diameter Do2 to the third outside diameter Do3. In an embodiment, the apex of the isosceles or equilateral triangular barb at the outer circumferential edge 104 is a sharp edge, which in an embodiment has a maximum radius of 0.13 mm.

From the foregoing example embodiments depicted in FIGS. 1D-1H, it will be appreciated that the second section 222 may have more than one configuration suitable for providing the herein described locking feature 350. However, and without being held to any particular theory, it has been found that the locking feature 350 depicted in such figures as FIGS. 1A-1C, have better installation and locking performance characteristics as compared with alternative locking feature designs disclosed herein.

In FIG. 1D, diameter Do3 is depicted being equal to diameter Do1, while in FIG. 1E, diameter Do3 is depicted being less than diameter Do1. In the embodiment of FIG. 1E, and while not being held to any particular theory, it is contemplated that the reduced sidewall thickness in the third section 223 may provide for ease of deformation of the locking feature 350 during an installation procedure, as described herein below.

Figure 2:
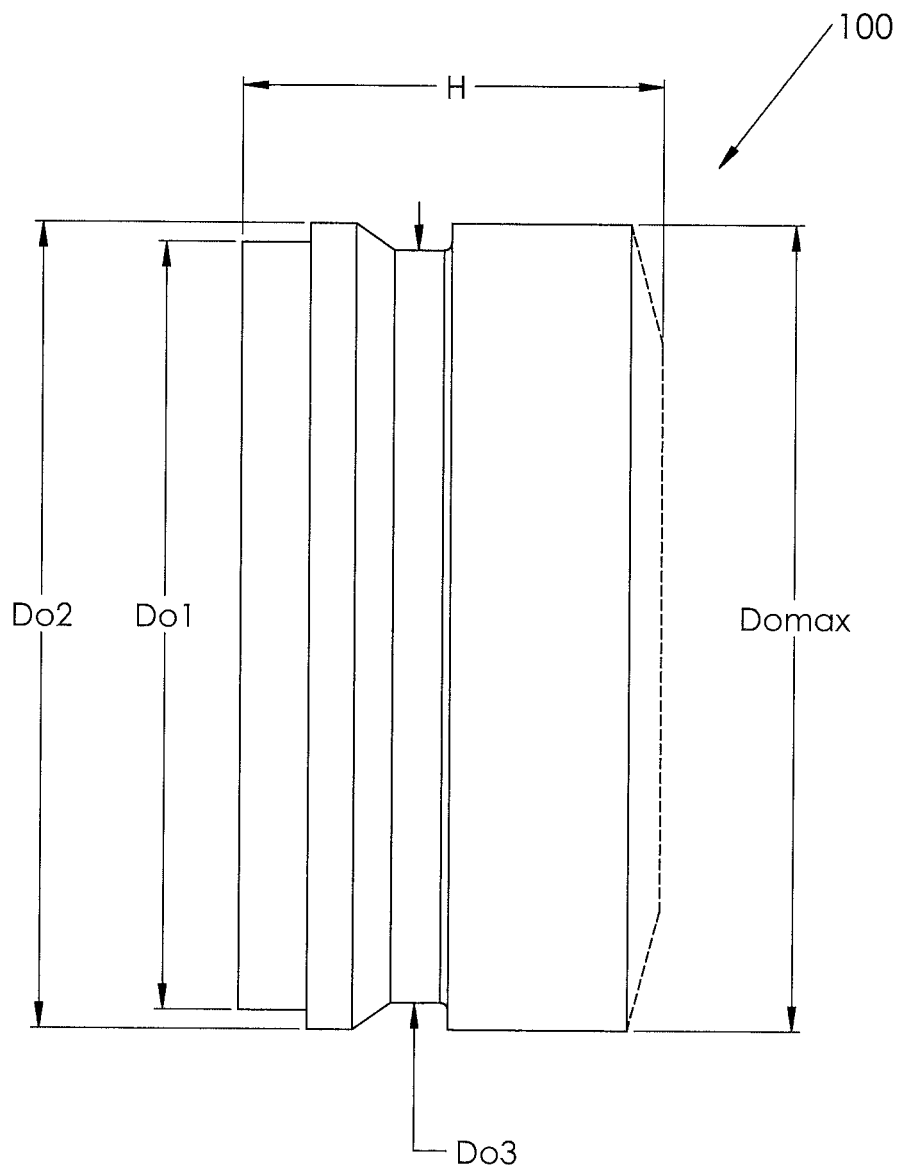
FIG. 2 depicts a side view of an example insert similar but alternative to that of FIG. 1A, having a similar diametral locking feature and an installation indication feature, but with alternative relationships for the illustrated outside diameters, in accordance with an embodiment.
Figure 3A:
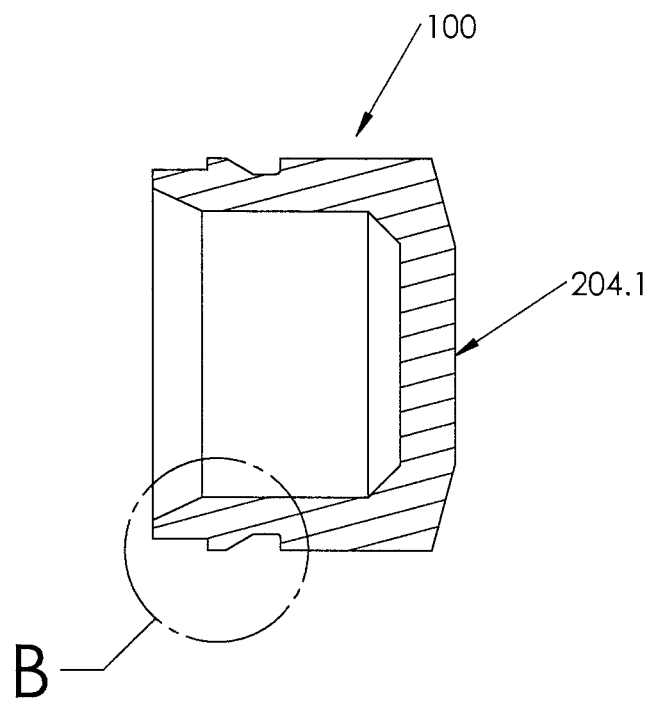
FIG. 3A depicts an axial cross section view of the example insert of FIG. 1A with a second end of the insert being solid or closed, in accordance with an embodiment.
Figure 3B:
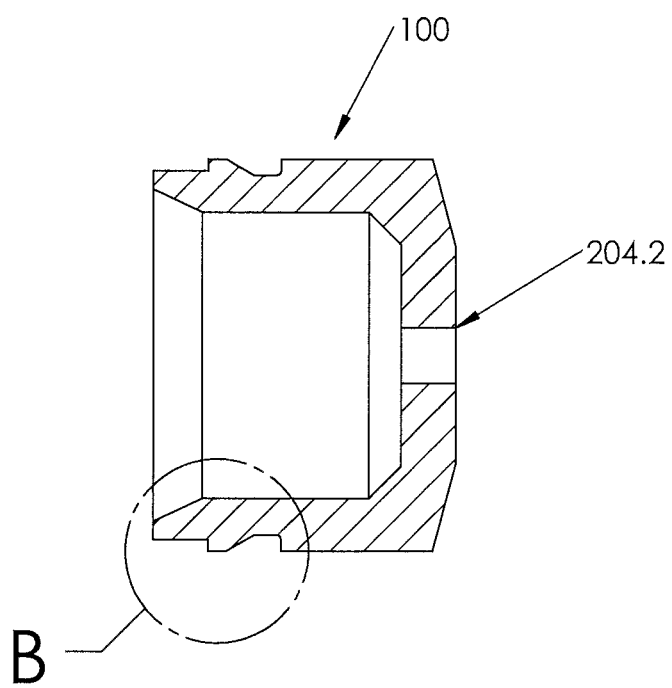
FIG. 3B depicts an axial cross section view of the example insert of FIG. 1A with a second end of the insert having a through orifice, in accordance with an embodiment.

Reference is now made to FIG. 2 in comparison with FIGS. 1B and 1D, where it is seen in FIGS. 1B and 1D that Do2 is depicted being equal to Domax (see also FIG. 1F), and where it is seen in FIG. 2 that Do2 is depicted being less than Domax. In an embodiment, the insert 100 depicted in FIGS. 1A-1F has a Domax equal to about 8 mm (millimeters), and the insert 100' depicted in FIG. 2 has a Domax equal to about 10 mm. As such, it will be appreciated that the diametral relationship between Do1, Do2, and Domax, may be adjusted to accommodate different diameter inserts having different insert force characteristics (discussed further herein below). In an embodiment, and by way of non-limiting example only, it has been shown that the construct of insert 100 depicted in FIGS. 1A-1F is suitable for inserts having a Domax equal to or greater than 4 mm and equal to or less than 8 mm, and that the construct of insert 100' depicted in FIG. 2 is suitable for inserts having a Domax equal to or greater than 9 mm and equal to or less than 10 mm. While certain dimensions are recited herein, such as 4 mm to 8 mm, and 9 mm to 10 mm, for example, it will be appreciated that a scope of the invention disclosed herein is not so limited, and that other dimensions suitable for a purpose disclosed herein may be equally applicable. As such, a scope of the invention disclosed herein should only be limited by the scope of the appended claims provided herein.

The diametral side wall 206 has an inside profile 230 between the first end 202 and the second end 204 having a first region 231 proximate the first end 202, a second region 232 contiguous with the first region 231, and a third region 233 proximate the second end 204 and contiguous with the second region 232. The first region 231 has an inside diameter that tapers from Di1 to Di2, where Di2 is less than Di1. The second region 232 has an inside diameter that is equal to Di2. In an embodiment of the insert 100 that functions as a plug, the third region 233 has an inside diameter that tapers from Di2 to Di3, where Di3 is less than Di2. However, and while not detracting from a scope of an invention disclosed herein, it will be appreciated that for other embodiments of the insert 100 that function as an orifice, a check valve, or other hydraulic component, the third region 233 may have some other profile suitable for its intended purpose. For example, where the insert 100 functions as a retainer for a secondary insert (not shown) to be inserted therein, the third region 233 may comprises a squared off shoulder, as opposed to the taper illustrated, which serves as a staking shoulder for seating the secondary insert. The tapered profile of the first region 231 tapers from Di1 at the first end 202 to Di2 at an end point 239 (best seen with reference to FIGS. 1D, 1E, and 1F) on an inside surface of the diametral side wall 206 radially across from the second section 222 of the outside profile 220 of the diametral side wall 206.

The first section 221 of the outside profile 220 and the first region 231 of the inside profile 230 of the diametral side wall 206 provide structure for the installation indication feature 300 that is plastically deformed upon completion of an installation procedure described further herein below. The second section 222 of the outside profile 220 of the diametral side wall 206 provides structure for a locking feature 350 (alternatively herein referred to as a locking barb feature) that is plastically deformed upon completion of an installation procedure described further herein below.

Regarding proper installation procedures for the insert 100, it is important to note that while the insert 100 disclosed herein is purposely designed with specified installation forces and pressure ratings to work under adverse conditions in a bore of a housing made of a specified material such as aluminum, other installation forces and pressure ratings may be specified for other housing materials. As such, it will be appreciated that the specified installation forces and pressure ratings disclosed herein are exemplary only and are non-limiting to an invention falling within a scope of the appended claims.

A method of installation of the insert 100 into a circumferential bore 400 of a housing or manifold 500 will now be described with reference to FIGS. 4A, 4B, and 4C, collectively, in combination with FIGS. 1A-1D described above.

Figure 4A:
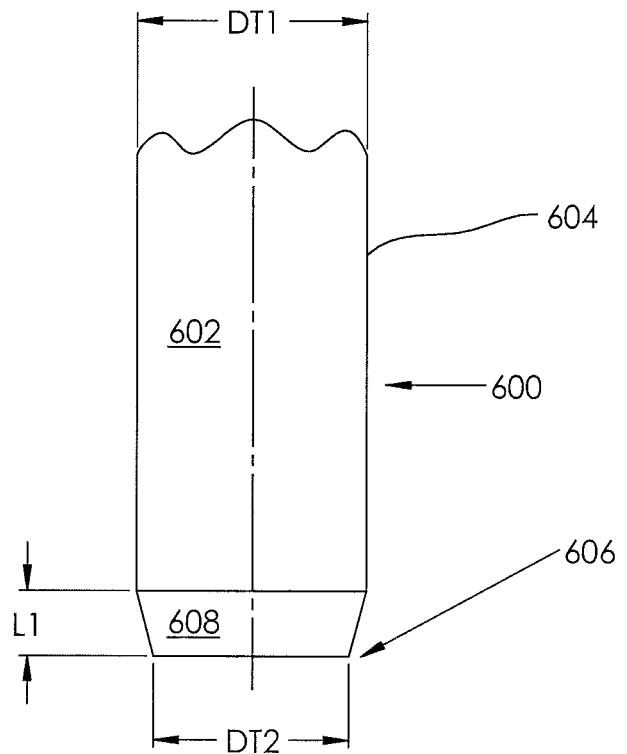
FIG. 4A depicts a step of a method of installing the insert of FIG. 1A into a bore, in accordance with an embodiment.
Figure 4A:
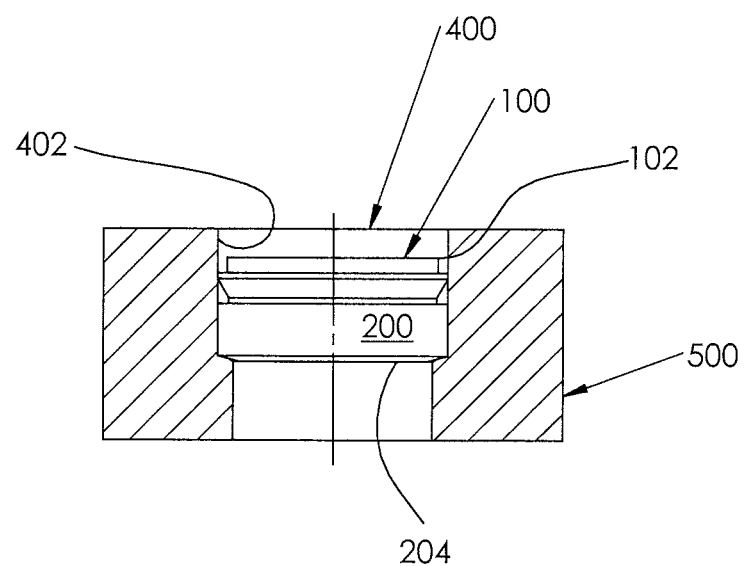
Figure 4B:
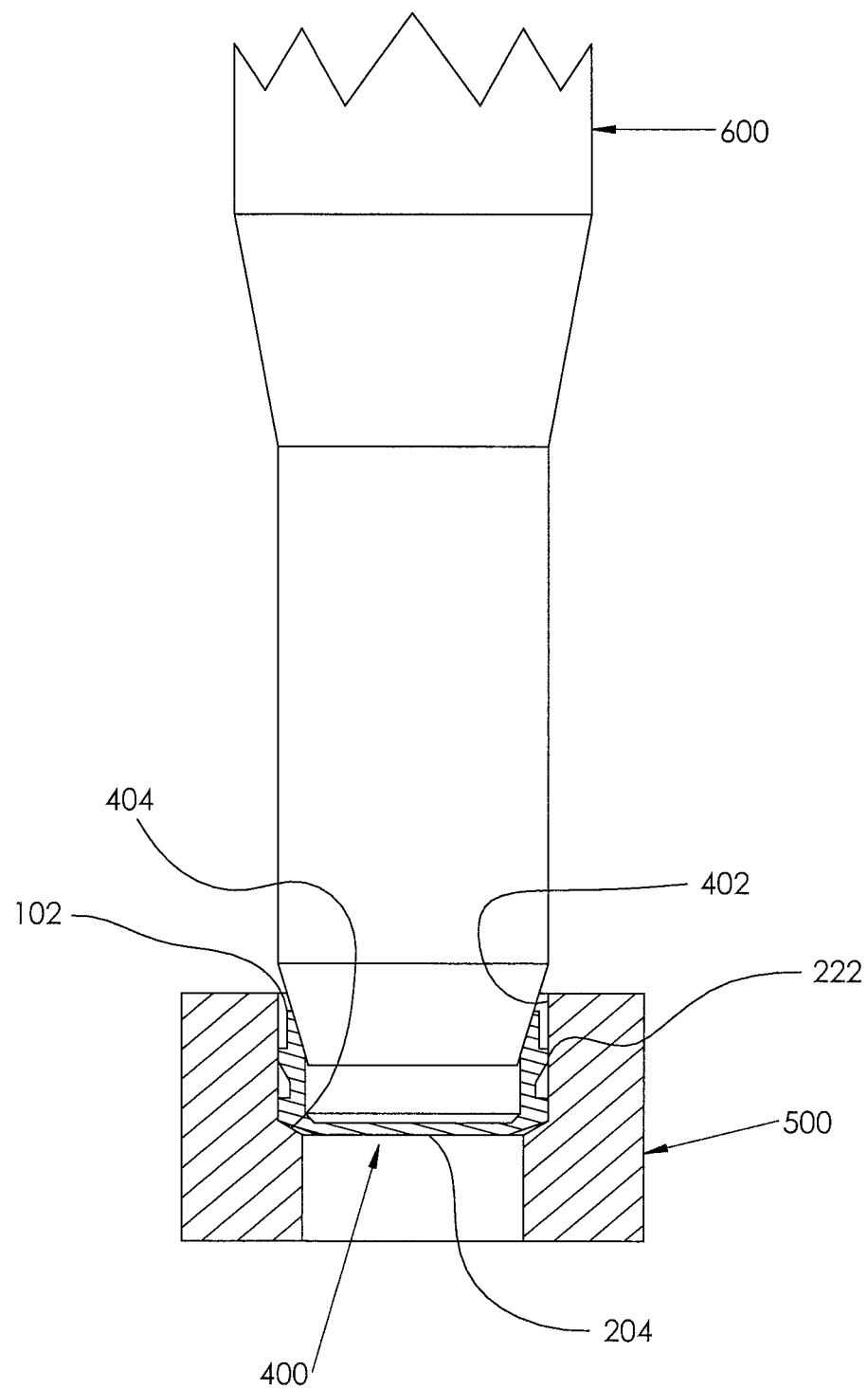
FIG. 4B depicts another step, subsequent to that of FIG. 4A, of the method of installing the insert of FIG. 1A into a bore, in accordance with an embodiment.
Figure 4C:
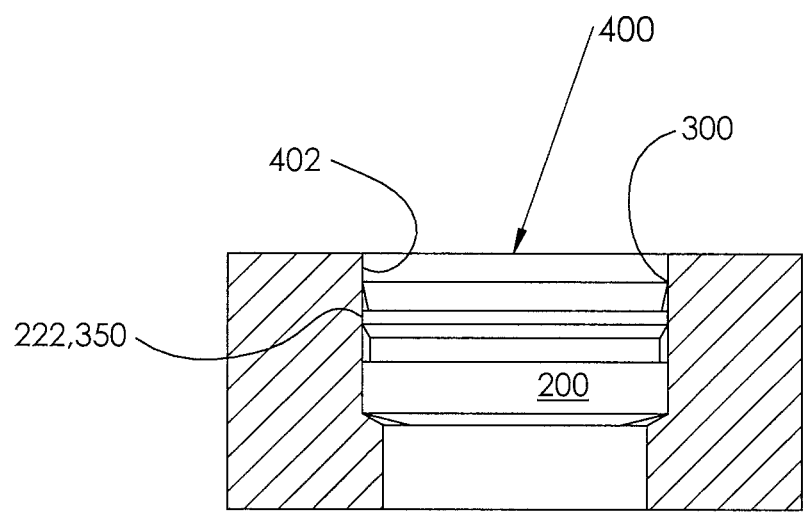
FIG. 4C depicts another step, subsequent to that of FIG. 4B, of the method of installing the insert of FIG. 1A into a bore, in accordance with an embodiment.

In an embodiment, the installation method comprises; axially inserting the body 200 of the insert 100, second end 204 first, into the bore 400 (see FIG. 4A for example) until the second end 204 of the body 200 engages a pre-formed support shoulder 404 in the bore 400 (see FIG. 4B for example), then using an installation tool 600 and axially pressing the body 200 of the insert 100 against the support shoulder 404 of the bore 400 while outwardly radially expanding and plastically deforming at least the second section 222 (locking barb 350) of the diametral side wall 206 against an interior wall 402 of the bore 400, and then using the installation tool 600 to further outwardly radially press and plastically deform at least the installation indication feature 300 of the body 200 of the insert 100 against the interior wall 402 of the bore 400 until the installation indication feature 300 contacts the interior wall 402 of the bore 400 around the circumference of the bore 400 (see FIG. 4C for example). The plastically deformed locking barb 350 serves to fixedly retain the insert 100 in the bore 400 in accordance with specified operating parameters. The plastically deformed installation indication feature 300 serves to provide visual indication of proper installation in accordance with specified installation procedures. In an embodiment, the installation indication feature 300 contacts the interior wall 402 of the bore 400 absent any voids therebetween around the circumference of the bore 400. During installation of the insert 100 into the bore 400 to engage the locking barb 350, the installation tool 600 is configured to transfer a radial force proximate the end point 239 toward the second section 222 to effect engagement of the locking barb 350 against the interior wall 402 of the bore 400, and during further installation of the insert 100 into the bore 400 to engage the indication feature 300, the installation tool 600 is configured to transfer a radial force proximate the first end 202 to effect engagement of the indication feature 300 against the interior wall 402 of the bore 400. During the installation process, with reference to FIGS. 4A-4C collectively, the indication feature 300 is radially expanded outward to bring the rim of the outer circumferential edge 102 into contact with the interior wall 402 of the bore 400.

In a non-limiting embodiment, the step of outwardly radially expanding and plastically deforming at least the second section 222 of the diametral side wall 206 against an interior wall 402 of the bore 400 occurs with an axial force of 5 KN-6 KN, and includes the use of the installation tool 600. While a certain axial installation force is disclosed herein, it will be appreciated that this is merely an example of the magnitude of force suitable for an example embodiment disclosed herein, and is not limiting to a scope of the invention presented in the appended claims. See FIGS. 7 and 8 for example, which correspond with different sized and structured inserts 100 and 100', respectively.

In an embodiment, and with reference primarily to FIG. 4A, the installation tool 600 comprises a shaft 602 having an axial circular cross section that tapers over a length L1 from an outside diameter DT1 on the body 604 of the shaft 602 to an outside diameter DT2 at the end 606 of the shaft 602, where DT2<DT1, and where DT1 is less than the inside diameter of bore 400. The diameter DT2 is sized to fit within diameter Di2 of the body 200 of the insert 100. The length L1 and the diameters DT1 and DT2 form a tapered surface 608 that is sized to interferingly engage with the diametral side wall 206 and the installation indication feature 300 of the body 200 of the insert 100 to enable the plastically deforming of the second section 222 (locking barb 350) and the plastically deforming of the installation indication feature 300 relative to the interior wall 402 of the bore 400, upon installation of the insert 100 into the bore 400, as depicted in FIGS. 4B and 4C. While FIG. 4C depicts a certain degree of plastic deformation of the installation indication feature 300 and the locking barb 350 against the interior wall 402 of the bore 400, it will be appreciated that this is just for illustration purposes only, and is non-limiting to a scope of the invention presented in the appended claims.

Figure 5B:
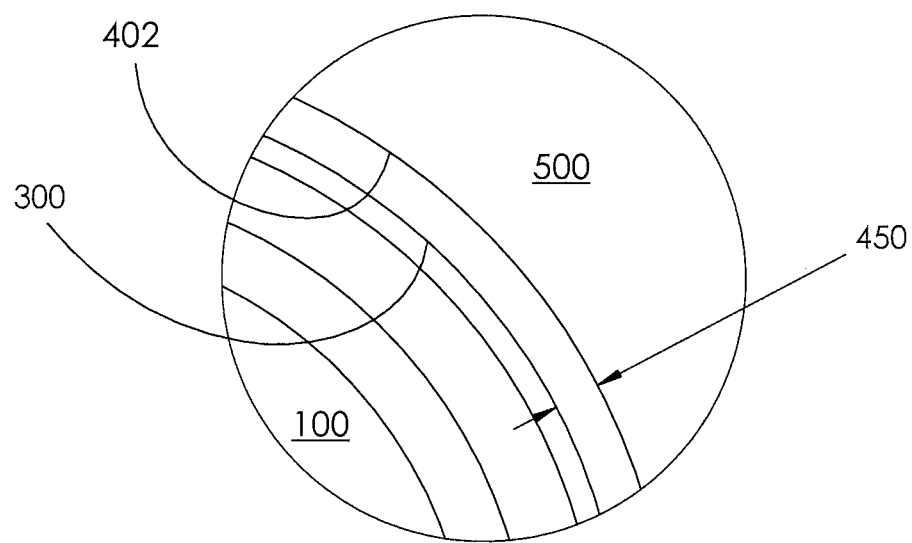
FIG. 5B depicts an enlarged portion of the plan view of FIG. 5A, in accordance with an embodiment.
Figure 5A:
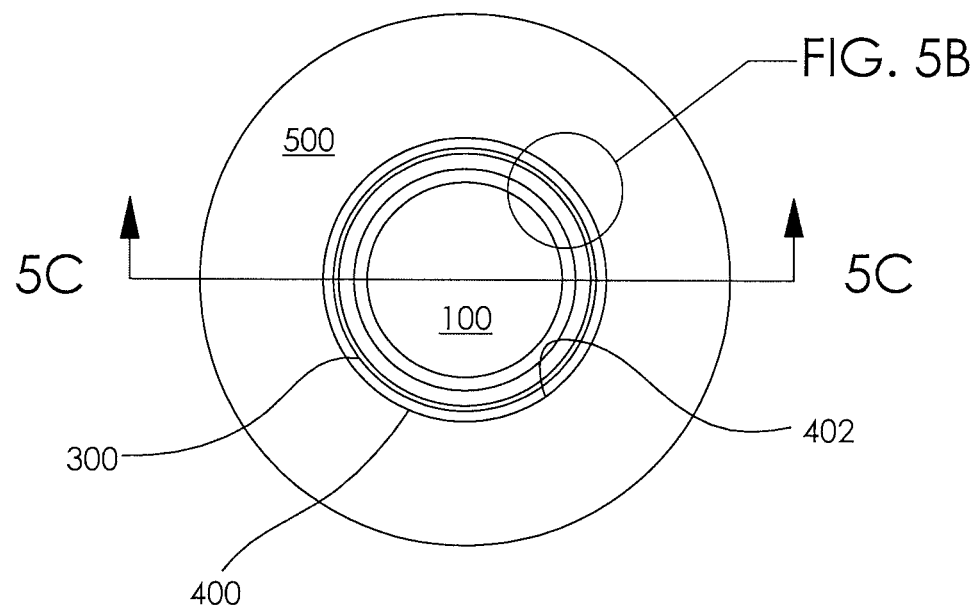
FIG. 5A depicts a plan view of a placement of the insert of FIG. 1A into a bore prior to finalization of the expansion of the installation indication feature in the bore, in accordance with an embodiment.

FIGS. 5A and 5B depict a placement of the insert 100 in the bore 400 of the manifold or housing 500 prior to finalization of the expansion of the installation indication feature 300 against the interior wall 402 of the bore 400. As can be seen, a visible gap 450 exists between the unexpanded installation indication feature 300 and the interior wall 402 of the bore 400 around a circumference of the bore 400.

Figure 5C:
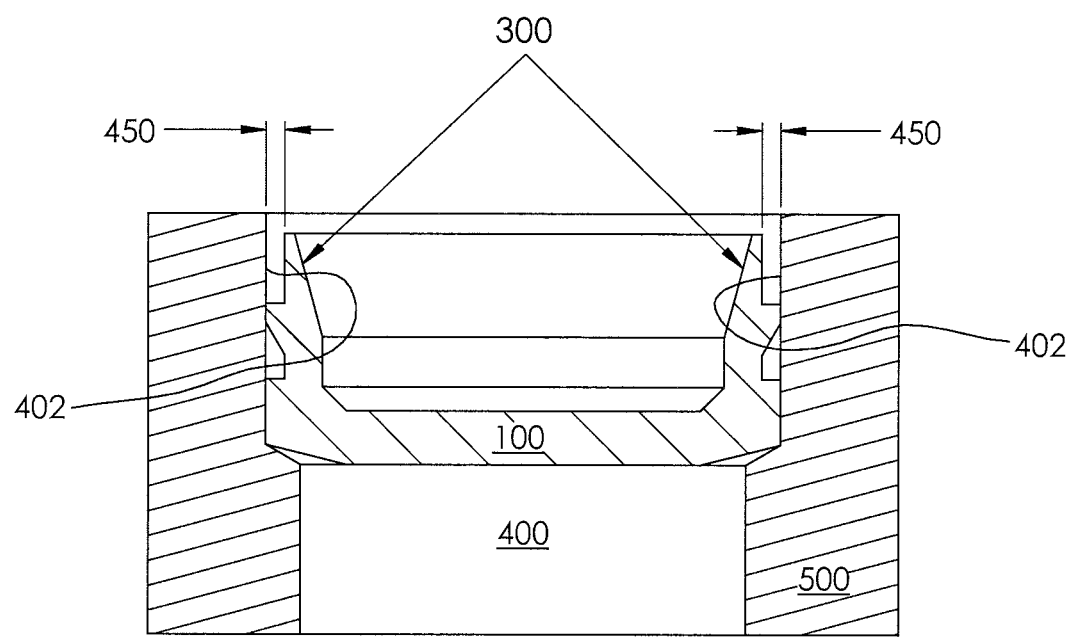
FIG. 5C depicts an axial cross-section view through cut line 5C-5C in FIG. 5A, in accordance with an embodiment.

FIG. 5C depicts an axial cross-section view through cut lines 5C-5C of FIG. 5A, where the visible gap 450 can be seen between the unexpanded installation indication feature 300 and the interior wall 402 of the bore 400 of the housing 500.

Figure 6B:
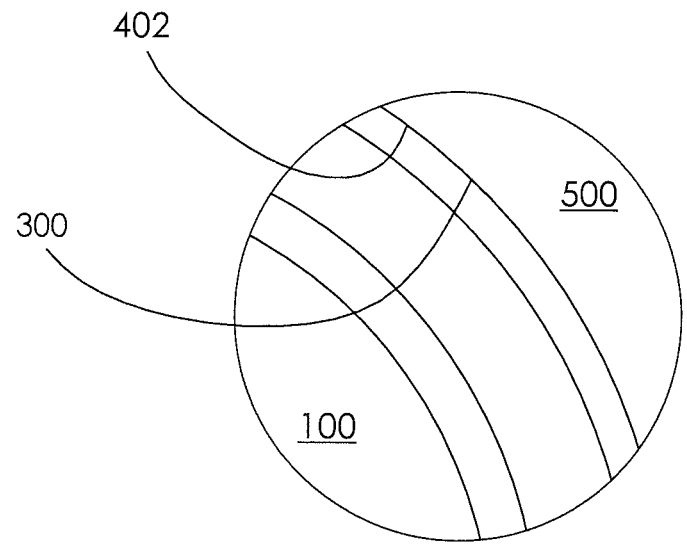
FIG. 6B depicts an enlarged portion of the plan view of FIG. 6A, in accordance with an embodiment.
Figure 6A:
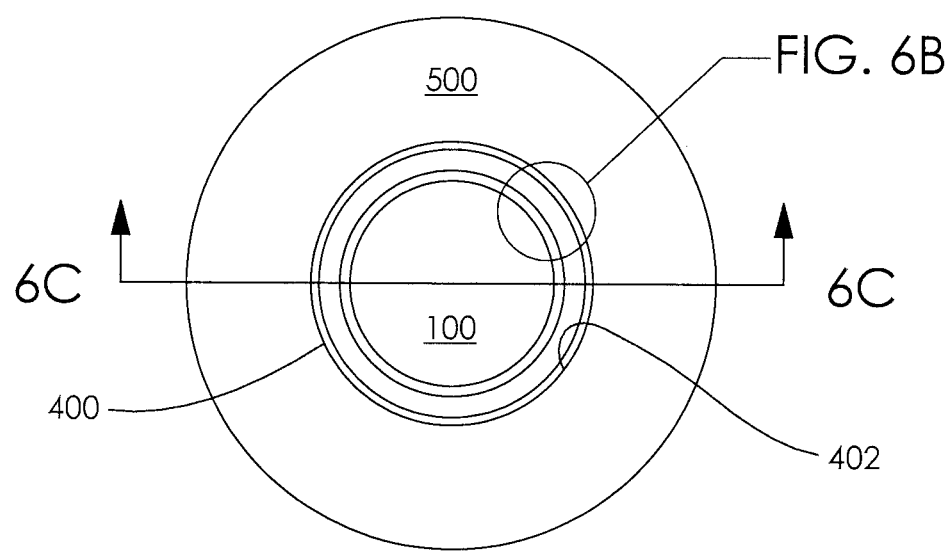
FIG. 6A depicts a plan view of the placement of the insert of FIG. 5A into the bore after finalization of the expansion of the installation indication feature in the bore, in accordance with an embodiment.

FIGS. 6A and 6B depict the insert 100 in the bore 400 of the manifold or housing 500 post finalization of the expansion of the installation indication feature 300 against the interior wall 402 of the bore 400. As can be seen, there is no visible gap between the expanded installation indication feature 300 and the interior wall 402 of the bore 400 around a circumference of the bore 400.

Figure 6C:
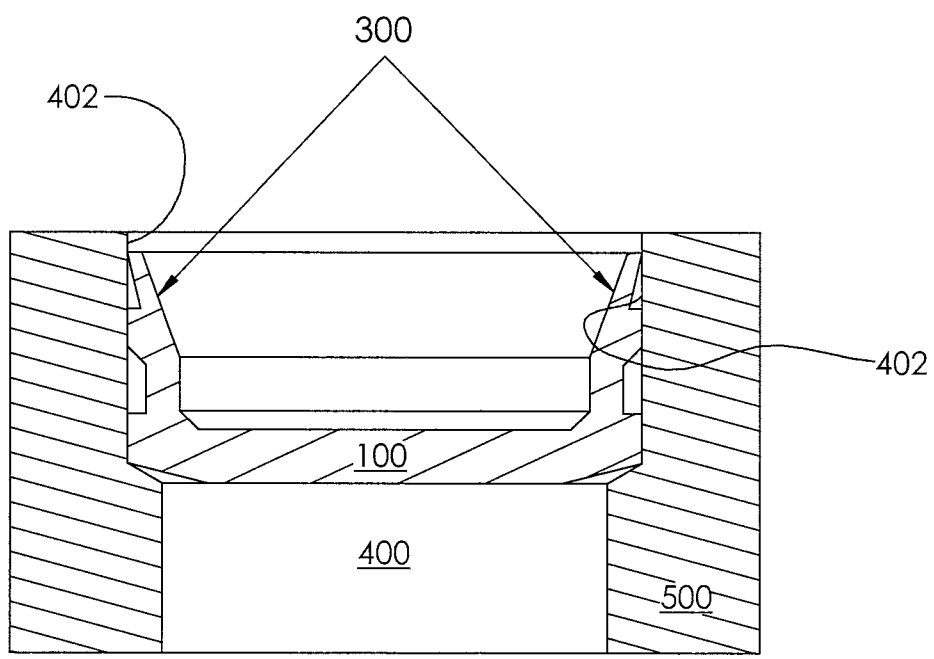
FIG. 6C depicts an axial cross-section view through cut line 6C-6C in FIG. 6A, in accordance with an embodiment.

FIG. 6C depicts an axial cross-section view through cut lines 6C-6C of FIG. 6A, where in contrast to FIG. 5C, there is no visible gap 450 (compare to visible gap 450 depicted in FIG. 5C) that can be seen between the expanded installation indication feature 300 and the interior wall 402 of the bore 400 of the housing 500.

Figure 7:
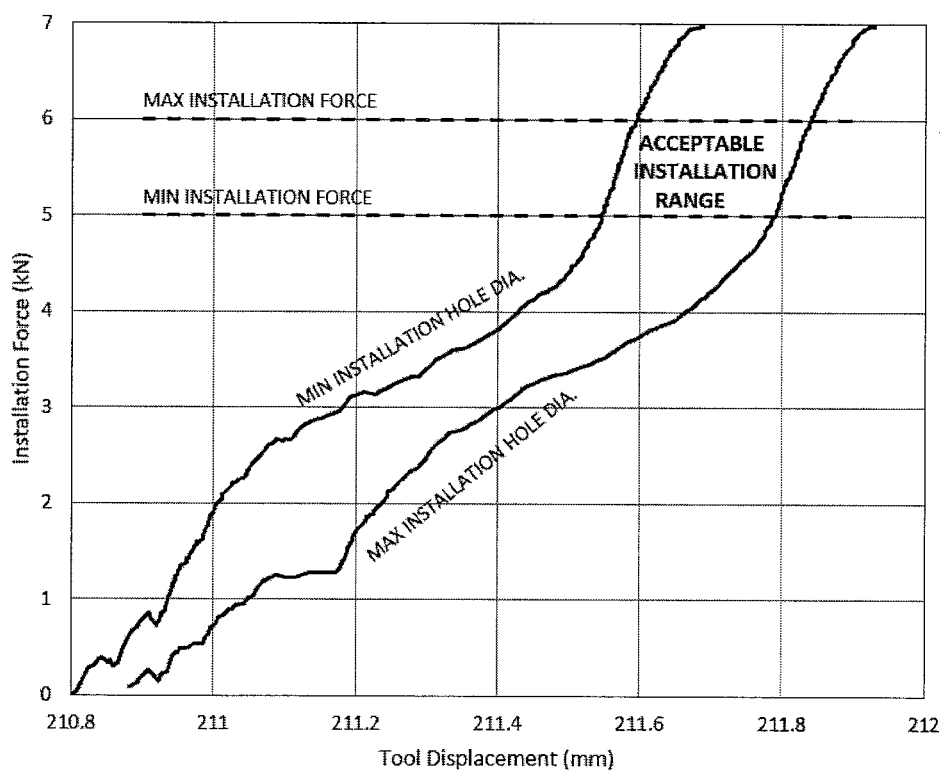
FIG. 7 depicts installation signature curve examples of force versus displacement for installation into a bore of the insert of FIG. 1A, in accordance with an embodiment.

FIG. 7 depicts installation signature curve examples of force versus displacement for a minimum sized installation bore 400 diameter and a maximum sized installation bore 400 diameter for an insert 100 having a Domax equal to about 8 mm. In an embodiment, the step of outwardly radially expanding and plastically deforming at least the second section 222 of the diametral side wall 206 against an interior wall 402 of the bore 400 occurs with an example axial force of about 5 KN-6 KN applied by the installation tool 600.

Figure 8:
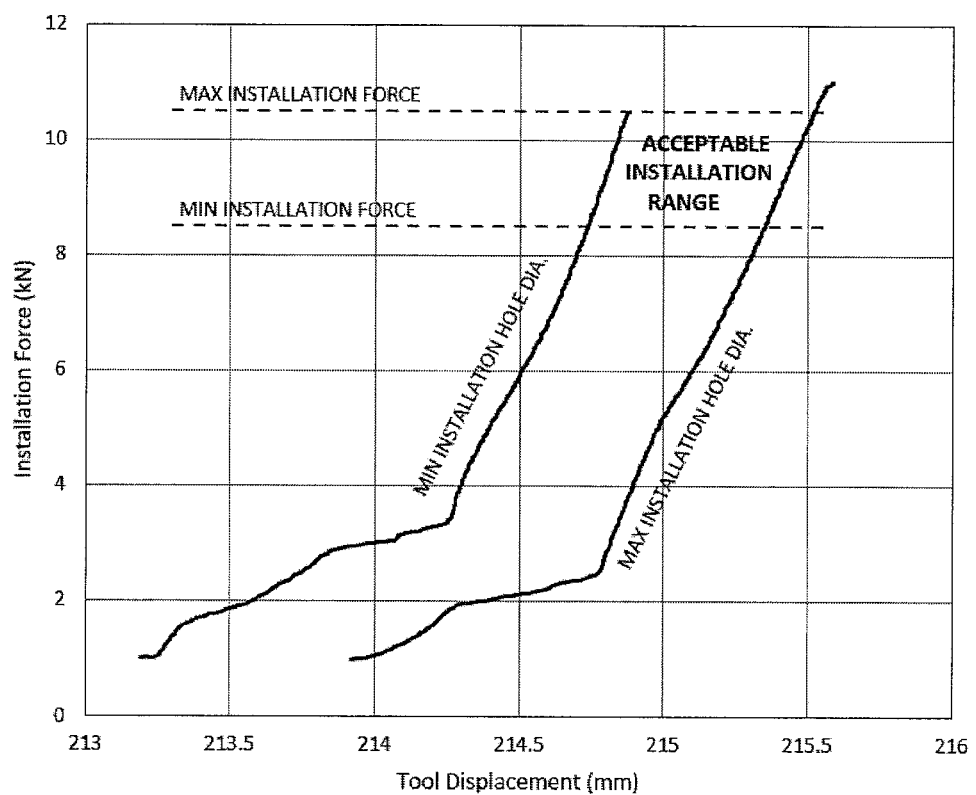
FIG. 8 depicts installation signature curve examples of force versus displacement for installation into a bore of the insert of FIG. 2, in accordance with an embodiment.

FIG. 8 depicts installation signature curve examples of force versus displacement for a minimum sized installation bore 400 diameter and a maximum sized installation bore 400 diameter for an insert 100' having a Domax equal to about 10 mm. In an embodiment, the step of outwardly radially expanding and plastically deforming at least the second section 222 of the diametral side wall 206 against an interior wall 402 of the bore 400 occurs with an example axial force of about 8.5 KN-10.5 KN applied by the installation tool 600.

In FIGS. 7 and 8, it should be noted that while the y-axis should be interpreted as depicting absolute force test values, the x-axis should be interpreted as depicting incremental displacement test values, not absolute displacement test values that may vary depending on testing setup.

While a certain loading profile of the insert 100, 100' into the bore 400 is disclosed herein for a certain sized insert 100, 100' (8 mm and 10 mm diameter for example) for proper installation indication, it will be appreciated that other loading profiles may be used for other sized inserts, which may be determinable once an end-user's loading specification has been established based on the materials of choice for the insert 100, 100' and housing 500 in which the bore 400 is formed.

From all of the foregoing, it will be appreciated that a proper installation of the insert 100 would be achieved and indicated by the indication feature 300 having all or a substantial portion of its outer circumferential edge 102 in contact with the interior wall 402 of the bore 400, as depicted in FIGS. 6B and 6C.

With respect to the foregoing, some embodiments disclosed herein may provide a fluidic device, such as a fluidic plug for sealing a bore hole, or a fluidic cross-over device to regulate flow via an orifice, for example, with one or more of the following advantages: a high degree of retention of the fluidic device in the bore; a high degree of sealing of the exterior of the fluidic device from bypassing fluid; and, an effective installation indication feature that indicates proper installation of the fluidic device.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. An insert having a diametral locking feature and an installation indication feature, comprising:
a body having first end, a second end, and a diametral side wall between the first end and the second end, the second end having an overall maximum outside diameter Domax;
wherein the diametral side wall has an outside profile between the first end and the second end having a first section proximate the first end, a second section contiguous with the first section, a third section contiguous with the second section, and a fourth section proximate the second end and contiguous with the third section;
wherein the first section has a first outside diameter Do1 that is less than Domax, and provides for the installation indication feature;
wherein the second section has a second outside diameter Do2 that is equal to or less than Domax;
wherein the third section has a third outside diameter equal to Do3;
wherein the fourth section has a fourth outside diameter equal to Domax;
wherein the diametral side wall has an inside profile between the first end and the second end having a first region proximate the first end, a second region contiguous with the first region, and a third region proximate the second end and contiguous with the second region;
wherein the first region has an inside diameter that tapers from a first inside diameter Di1 to a second inside diameter Di2, where Di2 is less than Di1;
wherein the second region has an inside diameter that is equal to Di2;
wherein the third region has an inside diameter that tapers from Di2 to a third inside diameter Di3, where Di3 is less than Di2;
wherein the tapered profile of the first region tapers from Di1 at the first end to Di2 at an end point on the diametral side wall radially across from the second or third sections of the outside profile of the diametral side wall.

2. The insert of claim 1, wherein:
Do2 is equal to Domax.

3. The insert of claim 1, wherein:
Do2 is less than Domax.

4. The insert of claim 1, wherein:
the first section of the body at the first end with diameter Do1 has an outer circumferential edge that is a sharp edge with a maximum radius of 0.13 mm.

5. The insert of claim 1, wherein:
the second section of the body at the transition from diameter Do1 to diameter Do2 has an outer circumferential edge that is a sharp edge with a maximum radius of 0.13 mm.

6. The insert of claim 1, wherein:
the second section comprises a first portion and a second portion, wherein the first portion is contiguous with the first section and has an outside diameter equal to Do2, and wherein the second portion is contiguous with the first portion and has an outside diameter that tapers from Do2 to Do3.

7. The insert of claim 6, wherein:
a transition from the first section to the first portion of the second section is substantially a step change from diameter Do1 to diameter Do2.

8. The insert of claim 1, wherein:
a transition from the first section to the second section is substantially a step change from diameter Do1 to diameter Do2.

9. The insert of claim 1, wherein:
the second section comprises a first portion and a second portion, wherein the first portion is contiguous with the first section and has an outside diameter that tapers from Do1 to Do2, and wherein the second portion is contiguous with the first portion and has an outside diameter equal to Do2.

10. The insert of claim 9, wherein:
a transition from the second portion of the second section to the third section is substantially a step change from diameter Do2 to diameter Do3.

11. The insert of claim 1, wherein:
the second section comprises a first portion and a second portion, wherein the first portion is contiguous with the first section and has an outside diameter that tapers from Do1 to Do2, and wherein the second portion is contiguous with the first portion and has an outside diameter that tapers from Do2 to Do3.

12. The insert of claim 1, wherein: the second section of the outside profile of the diametral side wall provides structure for the diametral locking feature.

13. The insert of claim 1, wherein:
the first section of the outside profile and the first region of the inside profile of the diametral side wall provide structure for the installation indication feature.

14. A method of installing the insert of claim 1 into a circumferential bore, the method comprising:
axially inserting the body of the insert, second end first, into the bore until the second end of the body engages a pre-formed support shoulder in the bore;
axially pressing the body of the insert against the support shoulder of the bore while outwardly radially expanding and plastically deforming at least the second section of the diametral side wall against an interior wall of the bore;
further outwardly radially pressing and plastically deforming at least the installation indication feature of the body of the insert against the interior wall of the bore until the installation indication feature contacts the interior wall of the bore around the circumference of the bore.

15. The method of claim 14, wherein:
the installation indication feature contacts the interior wall of the bore absent any voids therebetween.

16. The method of claim 14, wherein:
the step of outwardly radially expanding and plastically deforming at least the second section of the diametral side wall against an interior wall of the bore occurs with an axial force in a range from 5 KN to 6 KN.

17. The method of claim 14, wherein:
the step of outwardly radially expanding and plastically deforming at least the second section of the diametral side wall against an interior wall of the bore occurs with an axial force in a range from 8.5 KN to 10.5 KN.

18. The method of claim 14, wherein:
the step of axially pressing the body of the insert against the support shoulder of the bore includes the use of an installation tool.

19. The method of claim 18, wherein:
the installation tool comprises a shaft having a circular cross section that tapers over a length L1 from an outside diameter DT1 on the body of the shaft to an outside diameter DT2 at the end of the shaft;
the diameter DT2 is sized to fit within diameter Di2 of the body of the insert;
the length L1 and the diameters DT1 and DT2 form a tapered surface that is sized to interferingly engage with the diametral side wall and the installation indication feature of the body of the insert to enable the plastically deforming of the second section and the plastically deforming of the installation indication feature relative to the interior wall of the bore.

20. The method of claim 18, wherein:
the installation tool is applied with an axial installation force in a range from 5 KN to 6 KN.

21. The method of claim 18, wherein:
the installation tool is applied with an axial installation force in a range from 8.5 KN to 10.5 KN.

* * * * *